United States Patent [19]

Han

[11] Patent Number: 5,633,840

[45] Date of Patent: May 27, 1997

[54] METHOD OF SETTING AN INITIAL POSITION OF A PICKUP BASED ON DISK RECOGNITION AND A DISK PLAYER THEREFOR

[75] Inventor: Yeon-taek Han, Suwon, Rep. of Korea

[73] Assignee: Samsung Electronics Co., Ltd., Kyungki-do, Rep. of Korea

[21] Appl. No.: 421,322

[22] Filed: Apr. 13, 1995

[30] Foreign Application Priority Data

Apr. 13, 1994 [KR] Rep. of Korea ............... 94-7751

[51] Int. Cl.$^6$ .................. G11B 3/90; G11B 17/22
[52] U.S. Cl. .................. 369/32; 369/54; 369/58
[58] Field of Search .................. 369/32, 58, 54, 369/47, 48, 44.27–44.29, 44.26, 44.25, 44.35, 44.32

[56] References Cited

U.S. PATENT DOCUMENTS

| 5,003,521 | 3/1991 | Yoshida et al. | 369/54 |
| 5,130,967 | 7/1992 | Tanaka et al. | 369/32 |
| 5,414,684 | 5/1995 | Nonaka et al. | 369/58 |
| 5,463,602 | 10/1995 | Oka et al. | 369/58 |
| 5,465,245 | 11/1995 | Yanagawa | 369/58 |

FOREIGN PATENT DOCUMENTS 5135375  6/1993  Japan .................. 369/54

*Primary Examiner*—Tan Dinh
*Attorney, Agent, or Firm*—Sughrue, Mion, Zinn, Macpeak & Seas

[57] ABSTRACT

A disk player for setting an initial position of an optical pickup based on disk recognition places the optical pickup in the closest position to an initial position of the loaded disk, to swiftly recognize a type of the disk and quickly reproduce information recorded on the disk. The initial optical pickup is moved to any position between the TOC area of a mini-disk and that of a compact disk. In this state, a system controller judges whether the loaded disk is a mini-disk or a compact disk based on the signal read from the disk via the optical pickup. If the signal read from the disk is a stored signal, the system microcomputer judges that the loaded disk is a mini-disk and moves the optical pickup to a start position of the TOC area in the mini-disk. On the other hand, if the signal read from the disk is not a stored signal, the system microcomputer judges that the loaded disk is a compact disk and moves the optical pickup to a start position of the TOC area in the compact disk.

5 Claims, 4 Drawing Sheets

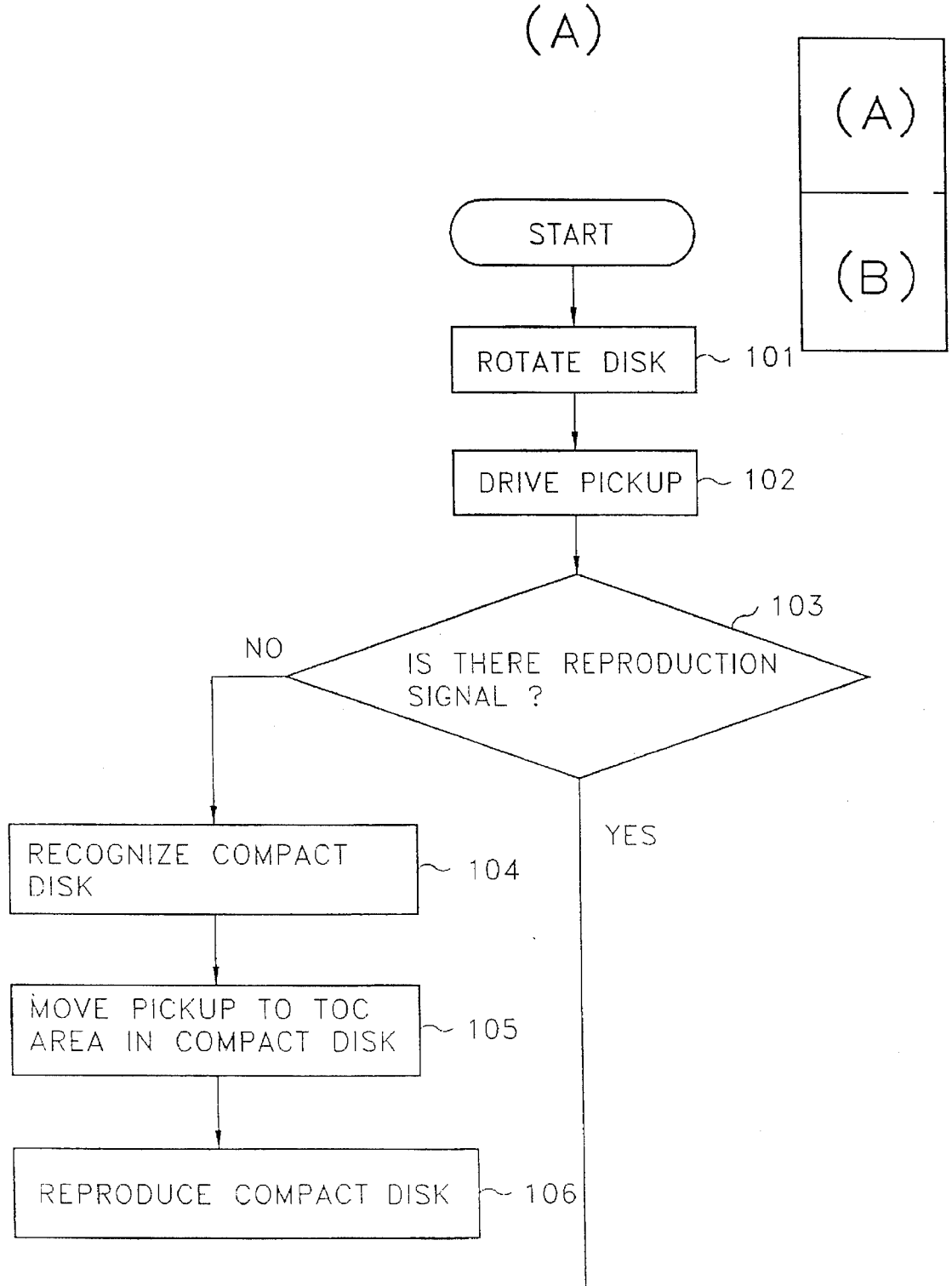

(B)

METHOD OF SETTING AN INITIAL POSITION OF A PICKUP BASED ON DISK RECOGNITION AND A DISK PLAYER THEREFOR

BACKGROUND OF THE INVENTION

1. Field of the Invention

The present invention relates to an initial position setting method of an optical pickup for reproducing signals recorded on disks having lead-in areas which start at different positions with respect to the center of the disk. The invention particularly relates to an initial position setting method of an optical pickup capable of swiftly moving the optical pickup to a start position of a lead-in area of an optical disk loaded in an optical player, based on disk recognition, and to an optical disk player using the same.

2. Description of Related Art

Generally, an optical disk recording and reproducing apparatus adopts a digital recording method which uses a disk on which an analog signal is sampled and converted into a digital signal so as to be finally recorded as a groove-shaped pattern known as a pit. In a structure of the disk, grooves which have different lengths (pits) are formed on concentric circles at a portion on which digital signals are recorded. The digital signals are recorded according to the varying position and length of the grooves. To read out the thusly-recorded signals, an optical pickup is required. The optical pickup projects a laser beam to the pits, and converts the reflected light into an electrical signal to thereby reproduce a signal, without the optical pickup contacting the disk. Here, the disk rotates at a constant linear velocity (CLV) or at a constant angular velocity (CAV) and the pickup moves from an inner circumference toward an outer circumference.

FIG. 1A shows a signal recording area of a general compact disk, and FIG. 1B shows a signal recording area of a general mini-disk. The signal recording areas of each of the disks comprises three sub-areas having a table of contents (TOC) area (B), a program area (C) and a lead-out area (D). In the case of an audio disk, the TOC area (B) contains a list of contents such as an address (a position on the disk) and a playing time of each audio program (such as a song) and the total playing time of all the audio programs which are recorded on the disk. The program area (C) is an area on which audio information is recorded, and the lead-out area is a signal area representing an end of the program, on which a lead-out signal, which is a repeat pulse of a predetermined frequency, is recorded.

The positions of the above-described three areas will be described below in more detail. In the case of the FIG. 1A compact disk, the lead-in TOC area (B) starts from a position which is distant by 23 mm from the center (A), and the program area (C) occupies a space starting from a position which is distant by 25 mm from the center (A) and extending to another position which is distant by 58 mm therefrom. The lead-out area (D) starts from an end position of the program area (C). In the case of the FIG. 1B mini-disk, the TOC area (B) starts from a position which is located 14.5 mm from the center (A), the program area (C) occupies a space starting from a position which is located 16.5 mm from the center (A) and extending to another position which is located 30.5 mm therefrom. The lead-out area (D) starts from an end position of the program area (C).

Recently, in most systems which reproduce a compact disk or a mini-disk having the above structure, when a disk is loaded, a pickup apparatus is immediately moved to a TOC area of the disk to read out information contained in the TOC area and to display the number of the audio programs (such as songs) contained on the disk and the total playing time. Therefore, the initial position of the optical pickup apparatus is set so that the optical pickup is positioned at a start position of the TOC area in the loaded disk at the time when the disk is initially loaded. However, when using a recently-developed product which accommodates both a compact disk and a mini-disk, since the start positions of the TOC areas of the compact disk and the mini-disk are different from each other as described above, it takes a long time to recognize which type of disk has been loaded and to find the initial position of the corresponding disk. For this reason, an interval from the loading of the disk to the start of reproducing the signal is long.

SUMMARY OF THE INVENTION

Therefore, to solve the above problem, it is an object of the present invention to provide a method for swiftly setting an initial position of a pickup to a lead-in area of the loaded disk, for use in a system capable of using different disks which have start positions of the lead-in areas different from each other.

It is another object of the present invention to provide an apparatus embodying the above method.

To accomplish the above object of the present invention, there is provided an initial position setting method of a pickup based on disk recognition so as to position the pickup to a start position of a lead-in area of the loaded disk in a disk player capable of reproducing information stored in disks having different recording methods, the initial position setting method comprising the steps of:

positioning the pickup at a predetermined position between start positions of the lead-in areas of the respective disks irrespective of a type of the loaded disk; reading signals from a corresponding area of the disk at which the pickup is positioned; recognizing the loaded disk based on the read signals; and re-positioning the pickup at a start position of the lead-in area of the loaded disk based on the disk recognition.

To accomplish the above object of the present invention, there is provided a disk player for positioning a position of a pickup at a start position of a lead-in area of the loaded disk in order to reproduce information stored in the disks of which start positions of the lead-in areas are different from each other, the disk player comprising:

a pickup for reading a signal from the loaded disk; and means for controlling movement of the pickup so that the pickup is positioned at a predetermined position between start positions of lead-in areas of the disks irrespective of a type of the loaded disk, receiving the signal read out by the moved pickup and re-positioning the pickup to a start position of a lead-in area of the loaded disk based on the received signal.

BRIEF DESCRIPTION OF THE DRAWINGS

The preferred embodiments are described with reference to the drawings wherein:

FIGS. 4A and 4B show recording areas of the mini-disk having pits or pre-grooves, in which FIG. 4A shows a reproduction-only mini-disk, and FIG. 4B shows a recordable mini-disk.

DETAILED DESCRIPTION OF THE PREFERRED EMBODIMENT

A preferred embodiment of the present invention will be described below in more detail with reference to the accompanying drawing FIGS. 2 through 4B.

Figure 2:
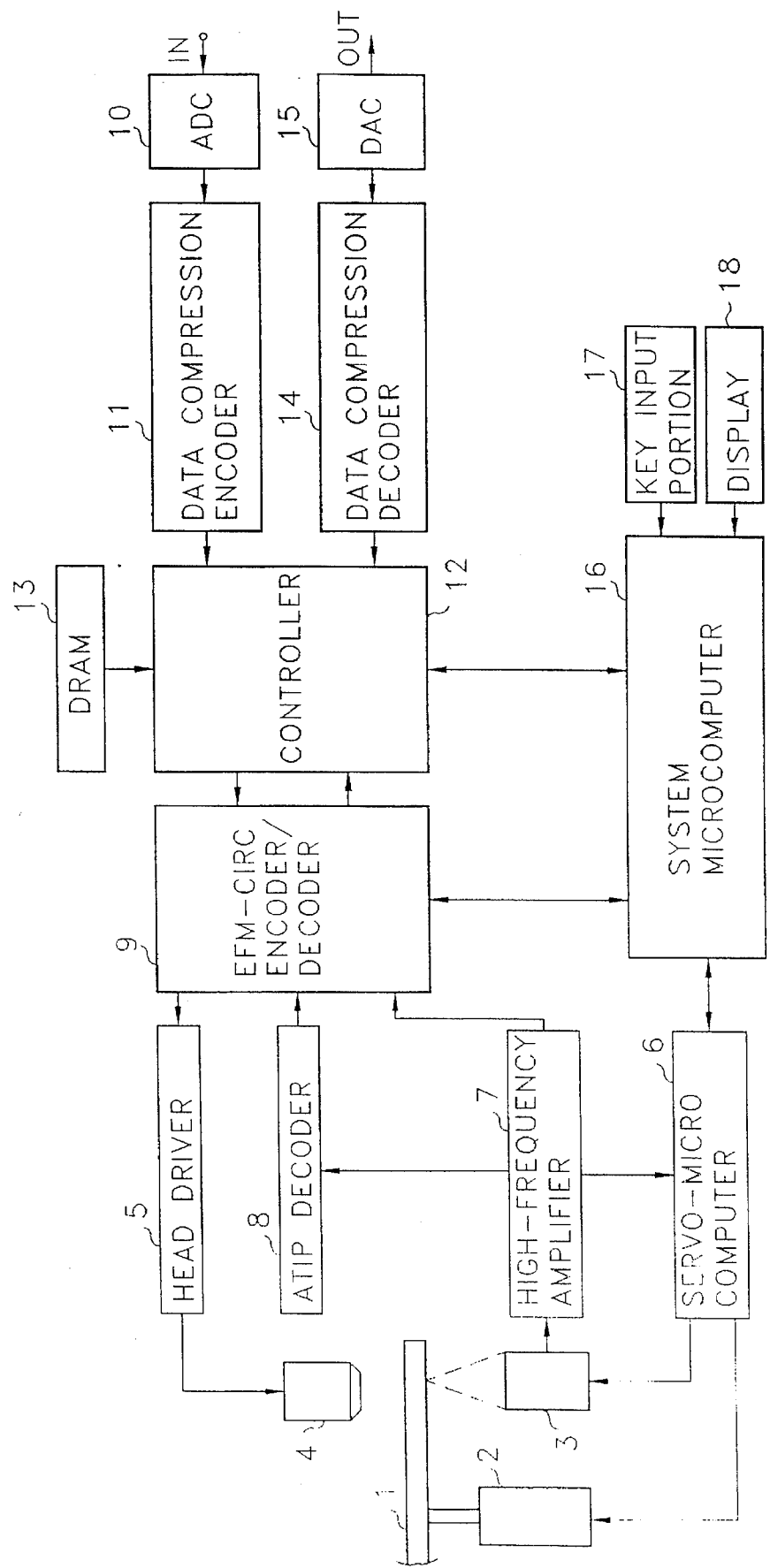
FIG. 2 is a block diagram of a disk player according to a preferred embodiment of the present invention.

FIG. 2 shows a disk player which can use both a compact disk and a mini-disk according to one embodiment of the present invention. The FIG. 2 apparatus is designed so that both a recordable mini-disk and a reproduction-only mini-disk can be used. A disk 1 is rotated by a spindle motor 2 at a predetermined velocity. An optical pickup 3 projects a laser beam to disk 1, converts the beam reflected from disk 1 into an electrical high-frequency signal, and outputs the converted signal to a high-frequency amplifier 7. A magnetic head 4 modulates a magnetic field existing in a corresponding position on disk 1 which is heated by an optical pickup 3 and, if the loaded disk 1 is a recordable mini-disk, records information thereon. A head driver 5 drives magnetic head 4 and controls magnetic head 4 so that a magnetic field modulation is accomplished according to an eight-to-fourteen modulation (EFM) signal output from an eight-fourteen modulation-cross interleave Reed Solomon code (EFM-CIRC) encoder/decoder 9. A servo-microcomputer 6 for servo-controlling spindle motor 2 and optical pickup 3 interfaces information with a system microcomputer 16 and controls a servo-mechanism (not shown) for driving optical pickup 3 and disk 1. Since a servo-control in connection with the drive of optical pickup 3 and disk 1 is well known to a person skilled in the art, the detailed descriptions thereof will be omitted. High-frequency amplifier 7 amplifies the high-frequency signal read from disk 1 by optical pickup 3 to a predetermined level, and outputs the amplified signal to a servo-microcomputer 6 and EFM-CIRC encoder/decoder 9, respectively. High-frequency amplifier 7 also outputs the high-frequency signal corresponding to an absolute time in pre-groove (ATIP) decoder 8. ATIP decoder 8 uses a wobbling frequency from the applied high-frequency signal, and detects an absolute time with respect to the disk. Here, the absolute time is a type of address code which is recorded from an initial portion to a final portion on the disk. ATIP decoder 8 outputs the detected absolute time to EFM-CIRC encoder/decoder 9. EFM-CIRC encoder/decoder 9 receives the output signals from ATIP decoder 8 and high-frequency amplifier 7 and reproduces the signal read from disk 1. The reproduced signal is supplied to a data compression decoder 14 via DRAM controller 12. DRAM controller 12 controls DRAM13 which is used for preventing a hunting phenomenon of a sound due to vibrations by processing the signal applied from EFM-CIRC encoder/decoder 9 by approximately one Mbit. Data compression decoder 14 decompresses the compressed signal applied from DRAM controller 12 and outputs the decompressed signal to a digital-to-analog converter 15. The output of digital-to-analog converter 15 is regenerated via a speaker (not shown). An analog-to-digital converter 10 converts the analog signal input from an external line input end IN into a digital signal so as to be supplied to a data compression encoder 11. Data compression encoder 11 uses a masking effect based on a human auditory minimum audible limit characteristic and compresses an amount of the data of the digital information signal applied from analog-to-digital converter 10 into approximately a fifth times, so as to be supplied to EFM-CIRC encoder/decoder 9 via DRAM controller 12. EFM-CIRC encoder/decoder 9 adds an error correction code to a signal to be recorded, which is applied from DRAM controller 12 according to a control signal of system microcomputer 16 and converts the number of the data bits from eight bits to fourteen bits, so as to be supplied to a head driver 5. EFM-CIRC encoder/decoder 9 also extracts an EFM signal from a high-frequency signal output from high-frequency amplifier 7 to demodulate the high-frequency signal, and performs error detection, correction and interpolation of the demodulated signal according to the error correction code so as to be supplied to DRAM controller 12. System microcomputer 16 exchanges the information with the blocks such as servo-microcomputer 6, EFM-CIRC encoder/decoder 9 and DRAM controller 12 to control a corresponding block. System microcomputer 16 is connected with a key input portion 17 for inputting a user function select command and a display 18 for displaying the current operating state or playing state according to a control signal of system microcomputer 16, respectively.

The FIG. 2 apparatus has a construction similar to a general construction of a disk player capable of using a reproduction-only mini-disk, a recordable mini-disk and a compact disk. However, the FIG. 2 apparatus has a system microcomputer 16 for performing a pickup position setting method proposed in the present invention with respect to a loaded disk. Thus, the already-known operation of the disk player will be omitted. The method and apparatus proposed by the present invention will be described below with reference to FIGS. 3 and 4.

Figure 1A:
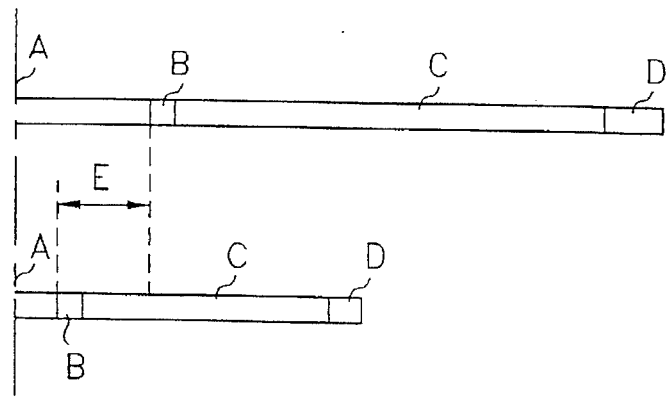
FIG. 1A shows a signal recording area of a general compact disk.
Figure 1B:
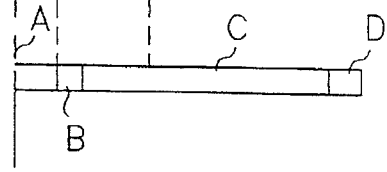
FIG. 1B shows a signal recording area of a general mini-disk.
Figure 3:
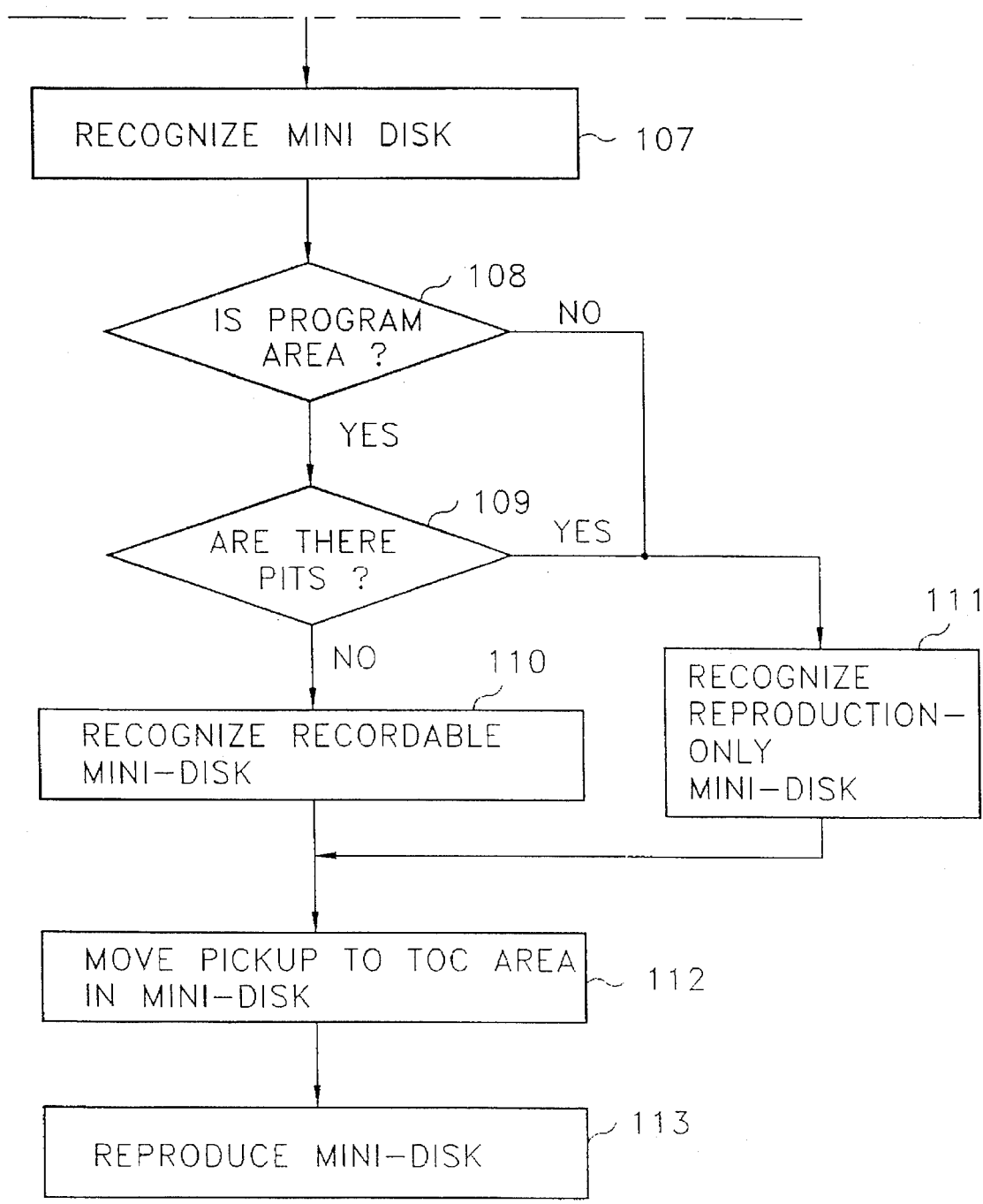
FIGS. 3A and 3B are flow-chart diagrams for explaining an initial position setting method of an optical pickup according to the present invention.

FIG. 3 shows a flow-chart diagram for explaining an initial position setting method of an optical pickup according to the present invention. First, referring to FIG. 1, the start position of TOC area (B) of the signal recording area of the compact disk and the start position of TOC area (B) of the mini-disk are separated by a clearance area having an interval (E). Thus, when a compact disk is loaded in the FIG. 2 apparatus, there is no signal recorded in the clearance area (E). If the loaded disk is a mini-disk, the TOC area (B) and program area (C) exist sequentially. The present invention utilizes the above arrangements to facilitate the use of a product which uses both a compact disk and a mini-disk. An optical pickup is positioned at any position of the clearance area (E) at the start of a reproduction operation. The type of disk which is loaded is recognized based on the presence or absence of the read signal. The optical pickup is then moved to a start position of the TOC area or the lead-in area of the loaded disk. Accordingly, the reproduction operation can be swiftly performed with respect to the loaded disk.

If the FIG. 2 apparatus starts the reproduction operation after loading disk 1, system microcomputer 16 drives spindle motor 2 via servo-microcomputer 6 to control the rotation of disk 1 to maintain a constant linear velocity irrespective of the inner/outer circumferences (step 101). If disk 1 rotates at a required linear velocity, system microcomputer 16 controls servo-microcomputer 6, so that optical pickup 3 is positioned at a predetermined position within the above-described clearance area (E) to read out a signal recorded on disk 1 (step 102). If optical pickup 3 reads out the signal from the corresponding area of disk 1, system microcomputer 16 judges whether optical pickup 3 has read the stored signal based on the signal applied via high-frequency amplifier 7 and EFM-CIRC encoder/decoder 9 (step 103). If it is judged that the stored signal is not read, that is, if the reproduction signal is not detected from a position on the disk in which the optical pickup is currently positioned, system microcomputer 16 recognizes that the loaded disk 1 is a compact disk (step 104). System microcomputer 16 controls servo-microcomputer 6 (step 105) to position optical pickup 3 at a position of the TOC area in the compact disk recognized in step 104, and controls a reproduction operation of the signal recorded in the compact disk (step 106).

Figure 4A:
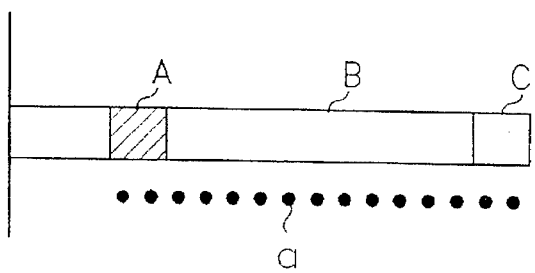
Figure 4B:
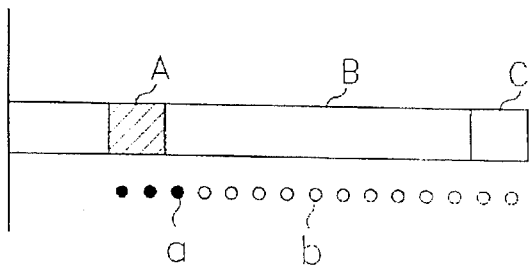

On the other hand, if it is judged that the signal read out by optical pickup 3 in step 103 is a signal contained in the disk, system microcomputer 16 recognizes that loaded disk 1 is a mini-disk (step 107). If the currently loaded disk 1 has been recognized as a mini-disk, system microcomputer 16 judges whether or not a position of the optical pickup 3 on disk 1 is located in a program area based on the signal applied via high-frequency amplifier 7 and EFM-CIRC encoder/decoder 9 (step 108). If it is judged in step 108 that the position is located in a program area, system microcomputer 16 judges whether the signal read via optical pickup 3 is a signal corresponding to a pit (step 109). A pattern of a signal recording surface of the mini-disk capable of performing step 109 will be described with reference to FIGS. 4A and 4B. A reproduction-only mini-disk has a lead-in (TOC) area (A), a program area (B) and a lead-out area (C), all of which areas include pits, as shown in FIG. 4A. On the other hand, the recordable mini-disk has a lead-in area (A) including pits, a program area (B) and a lead-out area (C) including pre-grooves. System controller 16 receives the information on the signal recording surfaces based on the above difference and performs step 109. If it is judged that there are no pits in step 109, system controller 16 extracts absolute time data from the data which is detected by ATIP decoder 7 and which is applied from EFM-CIRC encoder/decoder 9, and judges that the currently loaded disk 1 is a recordable mini-disk based on the extracted absolute time data (step 110). If it is judged that the position of the pickup is not in the program area in step 108, or if it is judged that there are pits in step 109, system microcomputer 16 judges that the loaded disk is a reproduction-only mini-disk (step 111). If the loaded disk is judged to be a reproduction-only mini-disk or a recordable mini-disk by step 110 or 111, system controller 16 controls servo-microcomputer 6 so as to move optical pickup 3 to a start position of the TOC area in the mini-disk (step 112). System controller 16 controls peripheral devices in order to perform a reproduction operation with respect to the mini-disk.

As described above, the present invention positions the optical pickup to any position between the TOC area of the mini-disk and the TOC area of the compact disk, recognizes a type of the loaded disk and swiftly moves the optical pickup to a TOC area of the corresponding disk. Accordingly, the present invention reduces the time interval between when a disk is loaded and the beginning of the reproduction operation.

While only certain embodiments of the invention have been specifically described herein, it will be apparent that numerous modifications may be made thereto without departing from the spirit and scope of the invention.

What is claimed is:

1. An initial position setting method of a pickup based on disk recognition so as to position the pickup at a start position of a lead-in area of a disk loaded in a disk player, said loaded disk being one of a plurality of types of disk, each of said plurality of types of disk being characterized by having a lead-in area located a unique distance from the center of the disk, the initial position setting method comprising the steps of:

positioning the pickup at a predetermined position of the disk loaded in the disk player, the predetermined position corresponding to a position between start positions of lead-in areas of respective types of disks;

reading signals from an area of the loaded disk corresponding to the predetermined position, the read signals containing information identifying the type of the loaded disk;

recognizing the type of the loaded disk based on the read signals; and re-positioning the pickup to a start position of the lead-in area of the loaded disk based on the step of recognizing the type of the loaded disk.

2. An initial position setting method of a pickup based on disk recognition, so as to position the pickup at a start position of a lead-in area of a disk loaded in a disk player, said loaded disk being one of a plurality of types of disk, each of said plurality of types of disk being characterized by having a lead-in area located a unique distance from the center of the disk, the initial position setting method comprising the steps of:

positioning the pickup at a predetermined position of the disk loaded in the disk player, the predetermined position corresponding to a position between start positions of lead-in areas of respective types of disks;

reading signals from an area of the loaded disk corresponding to the predetermined position, the read signals containing information identifying the type of the loaded disk;

recognizing the type of the loaded disk based on the read signals; and re-positioning the pickup to a start position of the lead-in area of the loaded disk based on the step of recognizing the type of the loaded disk;

wherein said recognizing step comprises the sub-steps of:

judging whether or not the read signals contain information stored on the loaded disk;

judging that the loaded disk is a mini-disk having a lead-in area a relatively short distance from a center of the loaded disk if it is judged that the read signals contain information stored on the loaded disk; and judging that the loaded disk is a compact disk having a lead-in area a relatively long distance from the center of the loaded disk if it is judged that the read signals do not contain information stored on the loaded disk.

3. A disk player which plays different types of disks, wherein a start position of a lead-in area of a disk is situated according to the type of disk, the disk player comprising:

a pickup for reading a signal from a disk which is loaded into the disk player; and means for controlling movement of the pickup so that the pickup is positioned at a predetermined position irrespective of the type of the loaded disk, the predetermined position being between start positions of lead-in areas of the different types of disks, and for receiving a signal read out by the pickup which has been moved to the predetermined position, said signal read by the pickup which is positioned at a predetermined position containing information identifying the type of the loaded disk, and for re-positioning the pickup to the start position of a lead-in area of the loaded disk based on the type of disk indicated by the signal read by the pickup which is positioned at a predetermined position.

4. A disk player according to claim 3, wherein said controlling means controls the re-positioning of said pickup to the start position of a lead-in area of a mini-disk if the signal read by the pickup which is positioned at a predetermined position indicates that a signal is stored in the loaded disk.

5. A disk player according to claim 3, wherein said controlling means controls the re-positioning of said pickup to the start position of a lead-in area of a compact disk if the signal read by the pickup which is positioned at a predetermined position does not indicate that a signal is stored in the loaded disk.

* * * * *